United States Patent
Wu et al.

(10) Patent No.: US 10,506,803 B1
(45) Date of Patent: Dec. 17, 2019

(54) FOLDABLE FISHING CHAIR

(71) Applicant: ZheJiang Nasite Commodity Co. Ltd., Jiaxing (CN)

(72) Inventors: Zi Ying Wu, Hangzhou (CN); Chang Ling Wu, Hangzhou (CN); Yun Hua Peng, Jiaxing (CN); Chang Ai Wu, Jiaxing (CN); Chen Yu Wu, Hangzhou (CN)

(73) Assignee: ZheJiang Nasite Commodity Co., Ltd. (CN)

( * ) Notice: Subject to any disclaimer, the term of this patent is extended or adjusted under 35 U.S.C. 154(b) by 0 days.

(21) Appl. No.: 16/006,967

(22) Filed: Jun. 13, 2018

(51) Int. Cl.
| A47C 7/70 | (2006.01) |
| A01K 97/22 | (2006.01) |
| A47C 1/14 | (2006.01) |
| A47C 4/04 | (2006.01) |
| A47C 7/00 | (2006.01) |
| A47C 13/00 | (2006.01) |
| B62B 1/00 | (2006.01) |

(52) U.S. Cl.
CPC ............. *A01K 97/22* (2013.01); *A47C 1/14* (2013.01); *A47C 4/04* (2013.01); *A47C 7/006* (2013.01); *A47C 7/70* (2013.01); *A47C 13/00* (2013.01); *B62B 1/00* (2013.01); *B62B 2202/402* (2013.01); *B62B 2205/00* (2013.01)

(58) Field of Classification Search
CPC .... B62B 1/04; B62B 1/12; B62B 1/20; B62B 2202/402; A47C 1/14; A47C 4/00; A47C 7/006; A47C 13/00; A47C 4/10; A47C 4/20; A47C 4/34; A47C 4/44
See application file for complete search history.

(56) References Cited

U.S. PATENT DOCUMENTS

| 3,930,662 | A | * | 1/1976 | Manner | ............... B62B 1/04 |
| | | | | | 280/648 |
| 4,323,260 | A | * | 4/1982 | Suchy | ............... A47C 4/20 |
| | | | | | 152/220 |
| 4,846,486 | A | * | 7/1989 | Hobson | ............... A47C 4/52 |
| | | | | | 280/47.25 |
| 4,934,719 | A | * | 6/1990 | duPont | ............... A47C 1/14 |
| | | | | | 280/30 |
| 5,203,815 | A | * | 4/1993 | Miller | ............... A01K 97/08 |
| | | | | | 211/149 |
| 5,213,360 | A | * | 5/1993 | Lin | ............... A47D 1/02 |
| | | | | | 280/30 |

(Continued)

FOREIGN PATENT DOCUMENTS

| CN | 2271471 | * | 12/1997 |
| CN | 201023499 | * | 2/2008 |

(Continued)

*Primary Examiner* — Emma K Frick

(57) ABSTRACT

A foldable fishing chair comprising a pull rod; a connecting rod with wheels is arranged at the bottom of the pull rod; a seat frame with a chair surface is rotationally connected to one side of the pull rod, and a front support is rotationally connected to the seat frame; a front support connecting rod that is rotationally connected with the pull rod is rotationally connected to the front support, and the other side of the pull rod is rotationally connected with a rear support; a goods shelf is rotationally connected to the rear support; a rear support connecting rod is arranged on the goods shelf and the rear support in a penetrating mode.

7 Claims, 3 Drawing Sheets

(56) References Cited

U.S. PATENT DOCUMENTS

| | | | | |
|---|---|---|---|---|
| 5,333,885 A * | 8/1994 | Pullman | ............... | B62B 1/10 273/285 |
| 5,356,197 A * | 10/1994 | Simic | ............... | A47C 13/00 280/204 |
| 5,374,073 A * | 12/1994 | Hung-Hsin | ............ | A45C 5/14 16/113.1 |
| 5,499,760 A * | 3/1996 | Pielocik | ............. | A47C 4/52 224/155 |
| 5,542,740 A * | 8/1996 | Chang | ............... | A47C 13/00 280/30 |
| 5,669,659 A * | 9/1997 | Dittmer | ............. | A47C 13/00 280/30 |
| 5,967,544 A * | 10/1999 | Kanta | ............... | A47C 9/027 280/47.24 |
| 6,079,777 A * | 6/2000 | Simmons | ............ | A47C 1/143 108/157.17 |
| 6,082,757 A * | 7/2000 | Lin | ............... | A01K 97/22 16/429 |
| 6,131,925 A * | 10/2000 | Weldon | ............. | B62B 1/12 280/30 |
| 6,312,048 B1 * | 11/2001 | Kilmer | ............. | A47C 1/14 297/129 |
| 6,561,524 B1 * | 5/2003 | Medina | ............. | A61G 5/061 280/250.1 |
| 7,178,863 B1 * | 2/2007 | Norval | ............. | A47C 4/20 297/29 |
| 7,316,407 B1 * | 1/2008 | Elden | ............... | B62B 1/12 280/124.12 |
| 8,297,642 B2 * | 10/2012 | Tyson, III | ............ | A47C 7/006 280/643 |
| 8,740,298 B2 * | 6/2014 | Kenttamaa-Squires | ............ | A47C 1/035 297/118 |
| 2002/0088829 A1 * | 7/2002 | Hsu | ............... | A45C 9/00 224/153 |
| 2018/0000252 A1 * | 1/2018 | Weldon | ............. | A47C 13/00 |
| 2019/0023299 A1 * | 1/2019 | Simmons | ............ | B62B 3/022 |

FOREIGN PATENT DOCUMENTS

| | | | |
|---|---|---|---|
| CN | 201320101474.6 | | 7/2013 |
| WO | WO2010015111 | * | 2/2010 |

* cited by examiner

FOLDABLE FISHING CHAIR

TECHNICAL FIELD OF THE INVENTION

The present invention relates to the technical field of fishing chairs, and more particularly, to a foldable fishing chair capable of being used as a pull-rod trolley.

BACKGROUND OF THE INVENTION

A fishing chair is a necessary tool for fishing enthusiasts, which helps them to better enjoy the fun of fishing. In the prior art, some traditional fishing chairs having a fishing box are usually provided with telescopic feet and anti-skid foot pads for supporting the chair, and some others adopt a folding chair/stool structure for serving purposes of convenient carrying and use. Chinese patent 201320101474.6 (published on Jul. 24, 2013) discloses a high-backrest riding-type fishing chair, which comprises a chair surface, a chair back and chair legs. A gun seat device is arranged on the chair legs. The gun seat device comprises a gun barrel, a rotary connecting member and a gun seat adjusting frame that is connected with the chair legs. The rotary connecting member is connected to the gun seat adjusting frame through left-right position adjusting screws, and the middle portion of the gun barrel is hinged to the rotary connecting member. The tail portion of the gun barrel is connected to the rotary connecting member through up-down position adjusting screws. The aforesaid fishing chair is not stable, and cannot be conveniently folded or moved.

SUMMARY OF THE INVENTION

The purpose of the present invention is to solve the shortcomings in the prior art by providing a foldable fishing chair, which solves the technical problems such as a poor supporting effect, low stability, difficult folding and transporting, and can be used as a pull-rod trolley for conveniently carrying fishing articles.

To achieve the above purpose, the present invention adopts the following technical solution:

A foldable fishing chair comprising a pull rod; a connecting rod with wheels is arranged at the bottom of the pull rod; a seat frame with a chair surface is rotationally connected to one side of the pull rod, and a front support is rotationally connected to the seat frame; a front support connecting rod that is rotationally connected with the pull rod is rotationally connected to the front support, and the other side of the pull rod is rotationally connected with a rear support; a goods shelf is rotationally connected to the rear support; a rear support connecting rod is arranged on the goods shelf and the rear support in a penetrating mode; the goods shelf is rotationally connected to a first goods shelf connecting rod and a second goods shelf connecting rod that are rotationally connected to the pull rod; the first goods shelf connecting rod and the second goods shelf connecting rod are rotationally connected, and the rear support connecting rod penetrates through the first goods shelf connecting rod; according to the above configuration, the seat frame and the goods shelf can be completely folded; due to the front support connecting rod and the rear support, the stability and the supporting effect of the fishing chair can be greatly improved; the goods shelf arranged at the rear portion of the fishing chair allows the fishing articles to be conveniently placed; the wheels arranged at the bottom of the pull rod enables the fishing chair to be easily moved; after the seat frame is folded, the fishing chair can be used as a pull-rod trolley.

In another aspect of the present invention, a backrest is arranged on the pull rod, which is capable of further improving the comfort level and the strength of the fishing chair.

In another aspect of the present invention, a goods rack is arranged on the backrest, which allows articles, such as a suitcase or a cloth bag, to be conveniently placed on the goods shelf and fixed with the pull rod, or be directly hung on the goods rack.

In another aspect of the present invention, a pin shaft and a hook piece are matched with each other and respectively fixedly arranged on the side edges of the front support and the pull rod so that the seat frame can be conveniently fixed when being folded.

In another aspect of the present invention, the front support connecting rod and the second goods shelf connecting rod are rotationally connected with the pull rod through a same pin.

In another aspect of the present invention, a clamping block and a groove that can be matched and locked with each other are respectively arranged on the first goods shelf connecting rod and the second goods shelf connecting rod.

Compared with the prior art, the present invention has the following advantages:

The present invention can be used as a fishing chair for fishing enthusiasts, and can be used as a pull-rod trolley for conveniently carrying the fishing articles. It can be easily folded and is very stable.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

MARKING INSTRUCTIONS OF THE DRAWINGS

1 Pull Rod, 2 Connecting Rod, 3 Wheel, 4 Seat Frame, 5 Chair Surface, 6 Front Support, 7 Front Support Connecting Rod, 8 Rear Support, 9 Goods Shelf, 10 Rear Support Connecting Rod, 11 The First Goods Shelf Connecting Rod, 12 The Second Goods Shelf Connecting Rod, 13 Backrest, 14 Goods Rack, 15 Hook Piece, 16 Pin Shaft

DETAILED DESCRIPTION OF THE INVENTION

Drawings and detailed embodiments are combined hereinafter to elaborate the technical principles of the present invention.

In this embodiment, the rotary connection of the present invention can be achieved through a pin-hinge joint.

Figure 1:
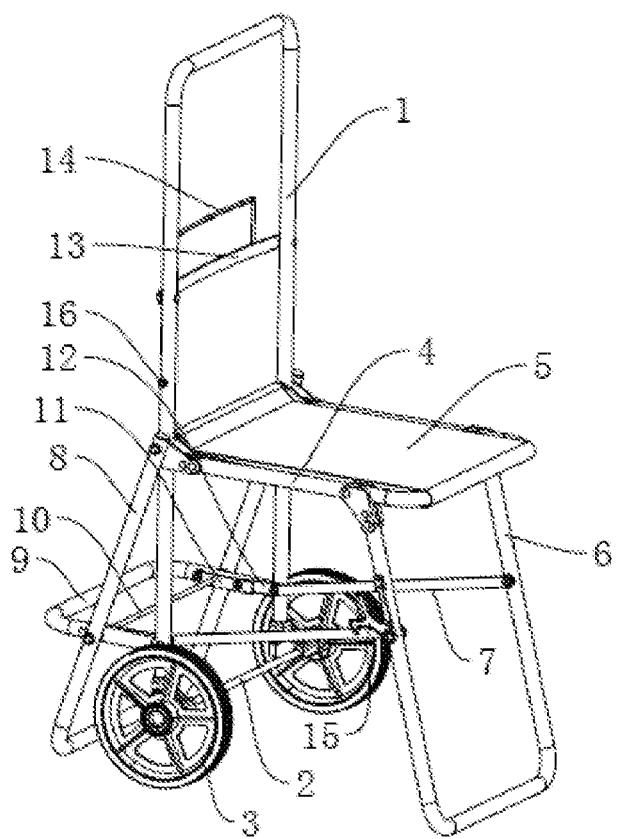
FIG. 1 is a front three-dimensional structural diagram of the present invention.
Figure 2:
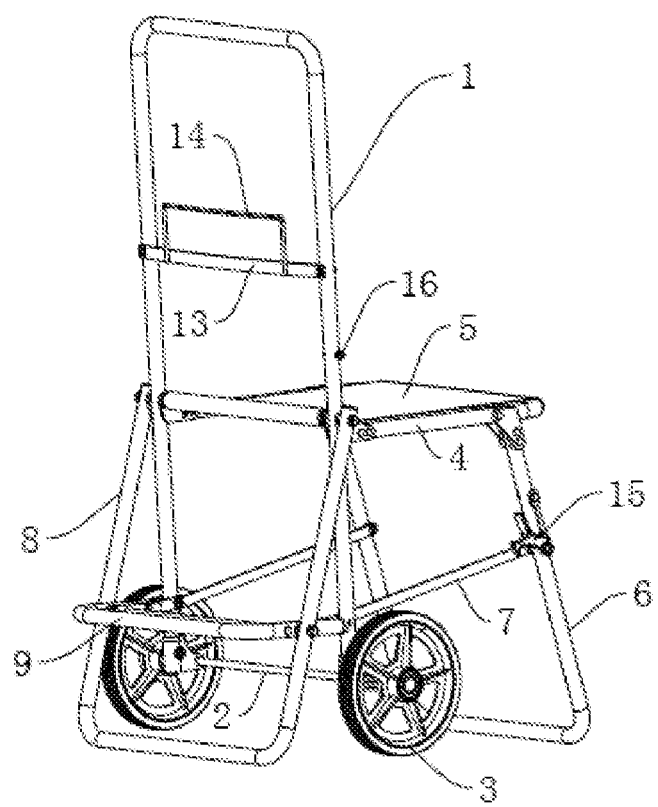
FIG. 2 is a rear three-dimensional structural diagram of the present invention.

As shown in FIGS. 1-2, the foldable fishing chair comprises a pull rod 1. A connecting rod 2 with wheels 3 is arranged at the bottom of the pull rod 1. A seat frame 4 with a chair surface 5 is rotationally connected to one side of the pull rod 1, and a front support 6 is rotationally connected to the seat frame 4. A front support connecting rod 7 that is rotationally connected with the pull rod 1 is rotationally connected to the front support 6, and the other side of the pull rod 1 is rotationally connected with a rear support 8. A goods shelf 9 is rotationally connected to the rear support 8. A rear support connecting rod 10 is arranged on the goods shelf 9 and the rear support 8 in a penetrating mode. The goods shelf 9 is rotationally connected to a first goods shelf connecting rod 11 and a second goods shelf connecting rod 12 that are rotationally connected to the pull rod 1. The first goods shelf connecting rod 11 and the second goods shelf connecting rod 12 are rotationally connected, and the rear support connecting rod 10 penetrates through the first goods shelf connecting rod 11.

Figure 3:
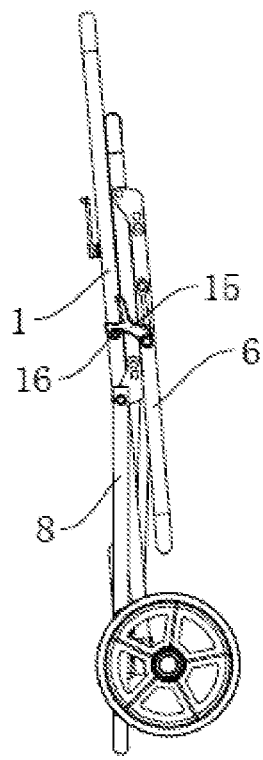
FIG. 3 is a structural diagram after the present invention is folded.

As shown in FIG. 3, according to the above design, the seat frame and the goods shelf can be completely folded against the pull rod. Due to the front support connecting rod and the rear support, the stability and the supporting effect of the fishing chair can be greatly improved. The goods shelf arranged at the rear portion of the fishing chair allows the fishing articles to be conveniently placed. Moreover, the wheels arranged at the bottom of the pull rod enable the fishing chair to be easily moved. After the seat frame is folded, the fishing chair can be used as a pull-rod trolley.

A backrest 13 is arranged on the pull rod 1, which is capable of further improving the comfort level and the strength of the fishing chair.

Furthermore, a goods rack 14 is arranged on the backrest 13, which allows articles such as a suitcase or a cloth bag to be conveniently placed on the goods shelf and fixed with the pull rod, or be directly hung on the goods rack.

A pin shaft 16 and a hook piece 15 that are matched with each other are respectively fixedly arranged on the side edges of the front support 6 and the pull rod 1. In this way, the seat frame can be conveniently fixed when being folded.

Moreover, the front support connecting rod 7 and the second goods shelf connecting rod 12 are rotationally connected with the pull rod 1 through a same pin.

Figure 4:
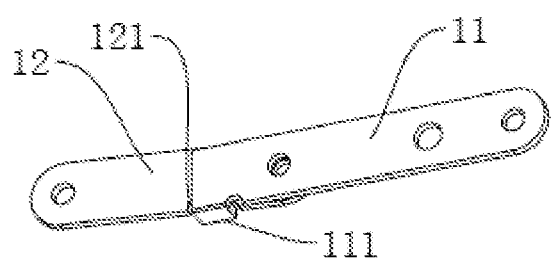
FIG. 4 is a structural diagram of the first goods shelf connecting rod and the second goods shelf connecting rod.

As shown in FIG. 4, a clamping block 111 and a groove 121 that can be matched and locked with each other are respectively arranged on the first goods shelf connecting rod 11 and the second goods shelf connecting rod 12.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A foldable fishing chair, comprising:
    a pull rod, wherein a connecting rod with wheels is arranged at the bottom of the pull rod,
    wherein a seat frame with a chair surface is rotationally connected to one side of the pull rod, and a front support is rotationally connected to the seat frame,
    wherein a front support connecting rod that is rotationally connected with the pull rod is rotationally connected to the front support, and the other side of the pull rod is rotationally connected with a rear support,
    wherein a goods shelf is rotationally connected to the rear support, wherein a rear support connecting rod is arranged on the goods shelf and the rear support in a penetrating mode,
    wherein the goods shelf is rotationally connected to a first goods shelf connecting rod and a second goods shelf connecting rod that are rotationally connected to the pull rod,
    wherein the first goods shelf connecting rod and the second goods shelf connecting rod are rotationally connected, and the rear support connecting rod penetrates through the first goods shelf connecting rod,
    wherein according to the above configuration, the seat frame and the goods shelf can be completely folded,
    wherein the front support connecting rod and the rear support provide stability and support for the fishing chair,
    wherein the goods shelf arranged at the rear portion of the fishing chair allows fishing articles to be conveniently placed,
    wherein the wheels arranged at the bottom of the pull rod enable the fishing chair to move easily, and
    wherein after the seat frame is folded, the fishing chair can be used as a pull-rod trolley.

2. The foldable fishing chair of claim 1, wherein the pull rod is provided with a backrest.

3. The foldable fishing chair of claim 2, wherein a goods rack is arranged on the backrest.

4. The foldable fishing chair of claim 1, wherein a pin shaft and a hook piece that are matched with each other are respectively fixedly arranged on the side edges of the front support and the pull rod.

5. The foldable fishing chair of claim 1, wherein the front support connecting rod and the second goods shelf connecting rod are rotationally connected with the pull rod through a same pin.

6. The foldable fishing chair of claim 1, wherein a clamping block and a groove that can be matched and locked with each other are respectively arranged on the first goods shelf connecting rod and the second goods shelf connecting rod.

7. The foldable fishing chair of claim 1, wherein the hook piece is made from plastic material.

* * * * *